US011906036B2

(12) United States Patent
Maurer et al.

(10) Patent No.: US 11,906,036 B2
(45) Date of Patent: Feb. 20, 2024

(54) AUTOMOTIVE TRANSMISSION WITH HEAT EXCHANGER BYPASS CARTRIDGE

(71) Applicant: Eaton Cummins Automated Transmission Technologies, LLC, Galesburg, MI (US)

(72) Inventors: Adam Christopher Maurer, Portage, MI (US); Graeme Andrew Jackson, Kalamazoo, MI (US)

(73) Assignee: Eaton Cummins Automated Transmission Technologies, LLC, Galesburg, MI (US)

( * ) Notice: Subject to any disclaimer, the term of this patent is extended or adjusted under 35 U.S.C. 154(b) by 714 days.

(21) Appl. No.: 16/802,883

(22) Filed: Feb. 27, 2020

(65) Prior Publication Data

US 2021/0270361 A1 Sep. 2, 2021

Related U.S. Application Data

(60) Provisional application No. 62/813,372, filed on Mar. 4, 2019.

(51) Int. Cl.
*F16H 57/04* (2010.01)
*F16N 39/02* (2006.01)

(52) U.S. Cl.
CPC ..... *F16H 57/0435* (2013.01); *F16H 57/0417* (2013.01); *F16N 39/02* (2013.01)

(58) Field of Classification Search
CPC ............ F16H 57/0417; F16H 57/0415; F16H 57/0413; F16H 57/0412; F16H 57/0424;

(Continued)

(56) References Cited

U.S. PATENT DOCUMENTS 4,922,765 A * 5/1990 Hayakawa ........... B60K 17/344
184/6.12
5,546,999 A * 8/1996 Parker .................... F02B 77/04
141/59

(Continued)

FOREIGN PATENT DOCUMENTS

CN  102338210 A  2/2012
DE  102014224414 A1  6/2016

(Continued)

OTHER PUBLICATIONS

Machine Translation of KR-1995-0011264-B1.*
Chinese Office Action dated Nov. 2, 2022 with English translation (corresponding to CN 202010142556.X).

*Primary Examiner* — Thomas C Diaz
(74) *Attorney, Agent, or Firm* — Harness, Dickey & Pierce, P.L.C.

(57) ABSTRACT

A transmission capable of being assembled as a coolerless transmission and a transmission having an oil cooler includes a housing and a lubrication system. The oil passage system includes an oil passage having an oil outlet opening extending out of the housing and an oil inlet opening extending into the housing. A bypass flow passage is disposed in the housing in communication with the oil outlet opening and the oil inlet opening. In a coolerless configuration a pair of plugs are inserted in the oil outlet opening and the oil inlet opening, respectively, to close off the oil outlet opening and the oil inlet opening so that oil flows from the oil outlet opening to the oil inlet opening through the bypass flow passage. In a transmission configuration having an oil cooler, an exterior oil cooler is connected to the oil outlet opening and the oil inlet opening.

10 Claims, 6 Drawing Sheets

(58) Field of Classification Search
CPC ... F16H 57/0423; F16H 57/0421; F16N 39/02
See application file for complete search history.

(56) References Cited

U.S. PATENT DOCUMENTS

| | | | |
|---|---|---|---|
| 6,189,655 | B1 | 2/2001 | Scheib et al. |
| 8,186,328 | B2 * | 5/2012 | Kiemlen ................ F01M 5/002 123/41.31 |
| 2009/0026405 | A1 * | 1/2009 | Sheppard ........... G05D 23/1333 251/364 |
| 2010/0116465 | A1 | 5/2010 | Jainek et al. |
| 2010/0218642 | A1 | 9/2010 | Leichsenring et al. |
| 2013/0139906 | A1 * | 6/2013 | Neelakantan ........... F16K 11/07 137/334 |
| 2015/0211395 | A1 * | 7/2015 | Gooden ................. F01P 11/08 236/34.5 |
| 2016/0047459 | A1 * | 2/2016 | Wen ...................... F16K 11/044 137/468 |
| 2017/0227113 | A1 * | 8/2017 | Malone ............... F16H 57/0413 |
| 2018/0017155 | A1 * | 1/2018 | Gooden ................ F01M 5/002 |
| 2019/0219148 | A1 * | 7/2019 | Brielmair ............. G05D 23/025 |
| 2021/0131579 | A1 * | 5/2021 | Kim ..................... F16K 11/044 |
| 2021/0404545 | A1 * | 12/2021 | Mason ............... F16H 57/0435 |
| 2022/0137653 | A1 * | 5/2022 | Campbell ............ G05D 23/122 137/15.19 |

FOREIGN PATENT DOCUMENTS

| | | | | |
|---|---|---|---|---|
| EP | 2305974 | A1 | 4/2011 | |
| EP | 2551569 | A1 | 1/2013 | |
| KR | 1995-0011264 | B1 * | 9/1995 | ............. B60K 23/00 |

* cited by examiner

AUTOMOTIVE TRANSMISSION WITH HEAT EXCHANGER BYPASS CARTRIDGE

CROSS-REFERENCE TO RELATED APPLICATIONS

This application claims the benefit of U.S. Provisional Application No. 62/813,372, filed on Mar. 4, 2019. The entire disclosure of the above application is incorporated herein by reference.

FIELD

The present disclosure relates to an automotive transmission with heat exchanger bypass cartridge that allows a transmission to be used with an exterior cooler or as a coolerless transmission.

BACKGROUND

This section provides background information related to the present disclosure which is not necessarily prior art.

Without limitation to a particular field of technology, the present disclosure is directed to transmissions configured for coupling to a prime mover, and more particularly to transmissions for vehicle applications, including truck applications.

Transmissions serve a critical function in translating power provided by a prime mover to a final load. The transmission serves to provide speed ratio changing between the prime mover output (e.g. a rotating shaft) and a load driving input (e.g. a rotating shaft coupled to wheels, a pump, or other device responsive to the driving shaft). The ability to provide selectable speed ratios allows the transmission to amplify torque, keep the prime mover and load speeds within ranges desired for those devices, and to selectively disconnect the prime mover from the load at certain operating conditions.

Transmissions are subjected to a number of conflicting constraints and operating requirements. For example, the transmission must be able to provide the desired range of torque multiplication while still handling the input torque requirements of the system. Additionally, from the view of the overall system, the transmission represents an overhead device—the space occupied by the transmission, the weight, and interface requirements of the transmission are all overhead aspects to the designer of the system. Transmission systems are highly complex, and they take a long time to design, integrate, and test; accordingly, the transmission is also often required to meet the expectations of the system integrator relative to previous or historical transmissions. For example, a reduction of the space occupied by a transmission may be desirable in the long run, but for a given system design it may be more desirable that an occupied space be identical to a previous generation transmission, or as close as possible.

Previously known high output transmissions have required a cooler to protect the parts and fluids of the transmission from overheating in response to the heat generated in the transmission. However, improvements in transmission designs, materials and lubrication systems have made it possible for high output transmissions to be made without requiring a cooler. Because some applications for a transmission may not require an oil cooler, while other applications for that same transmission may benefit from having an oil cooler, it is desirable to provide a system for modifying a transmission to be manufactured as either a coolerless transmission or as a transmission having an oil cooler.

SUMMARY

This section provides a general summary of the disclosure, and is not a comprehensive disclosure of its full scope or all of its features.

A transmission capable of being assembled as a coolerless transmission and as a transmission having an oil cooler includes a housing and a lubrication system. The oil passage system includes an oil passage having an oil outlet opening extending out of the housing and an oil inlet opening extending into the housing. A bypass flow passage is disposed in the housing in communication with the oil outlet opening and the oil inlet opening. In a coolerless configuration, a pair of plugs are inserted in the oil outlet opening and the oil inlet opening to close off the oil outlet opening and the oil inlet opening so that oil flows from the oil outlet opening to the oil inlet opening through the bypass flow passage. In a transmission configuration having an oil cooler, an exterior heat exchanger is connected to the oil outlet opening and the oil inlet opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
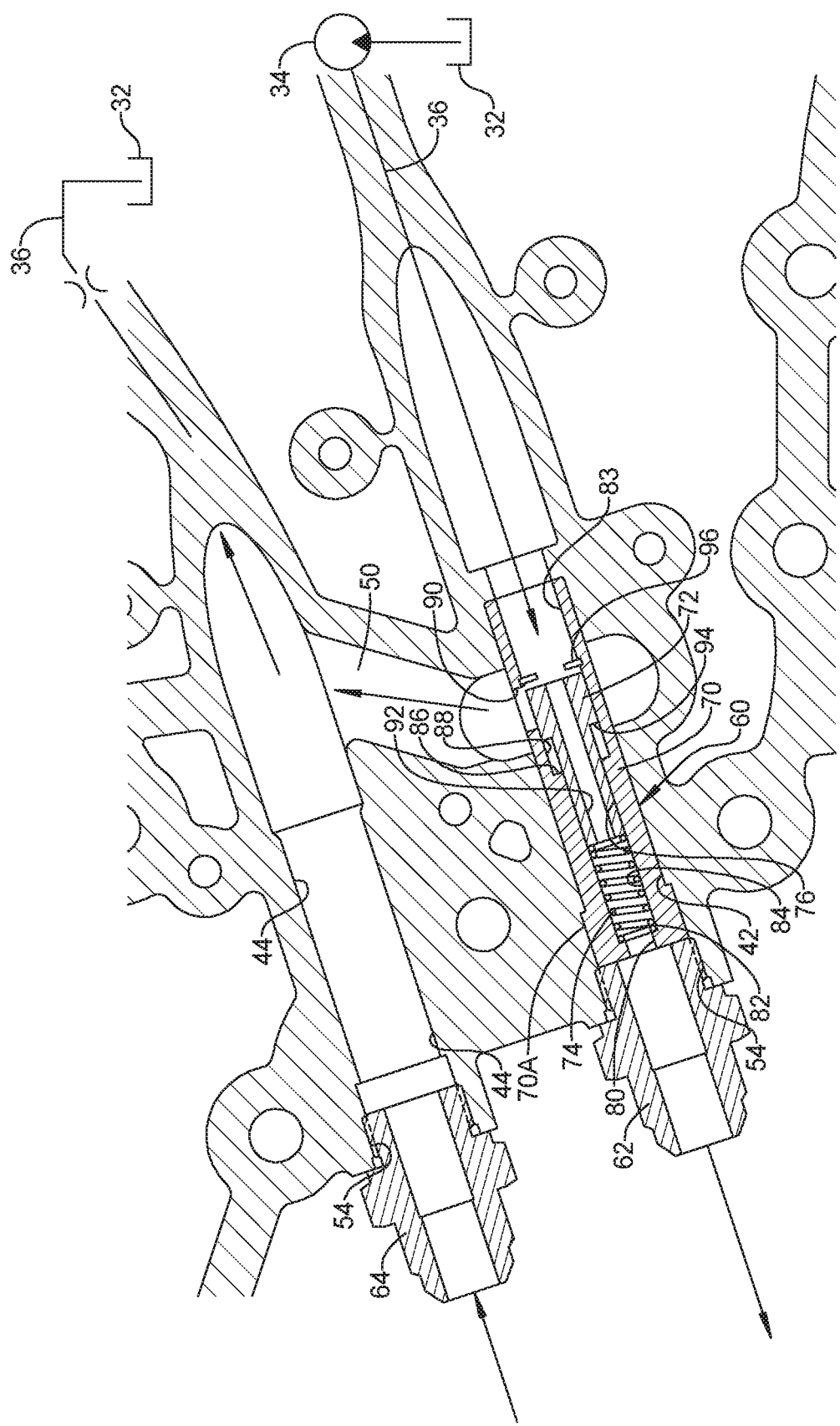
Figure 6:
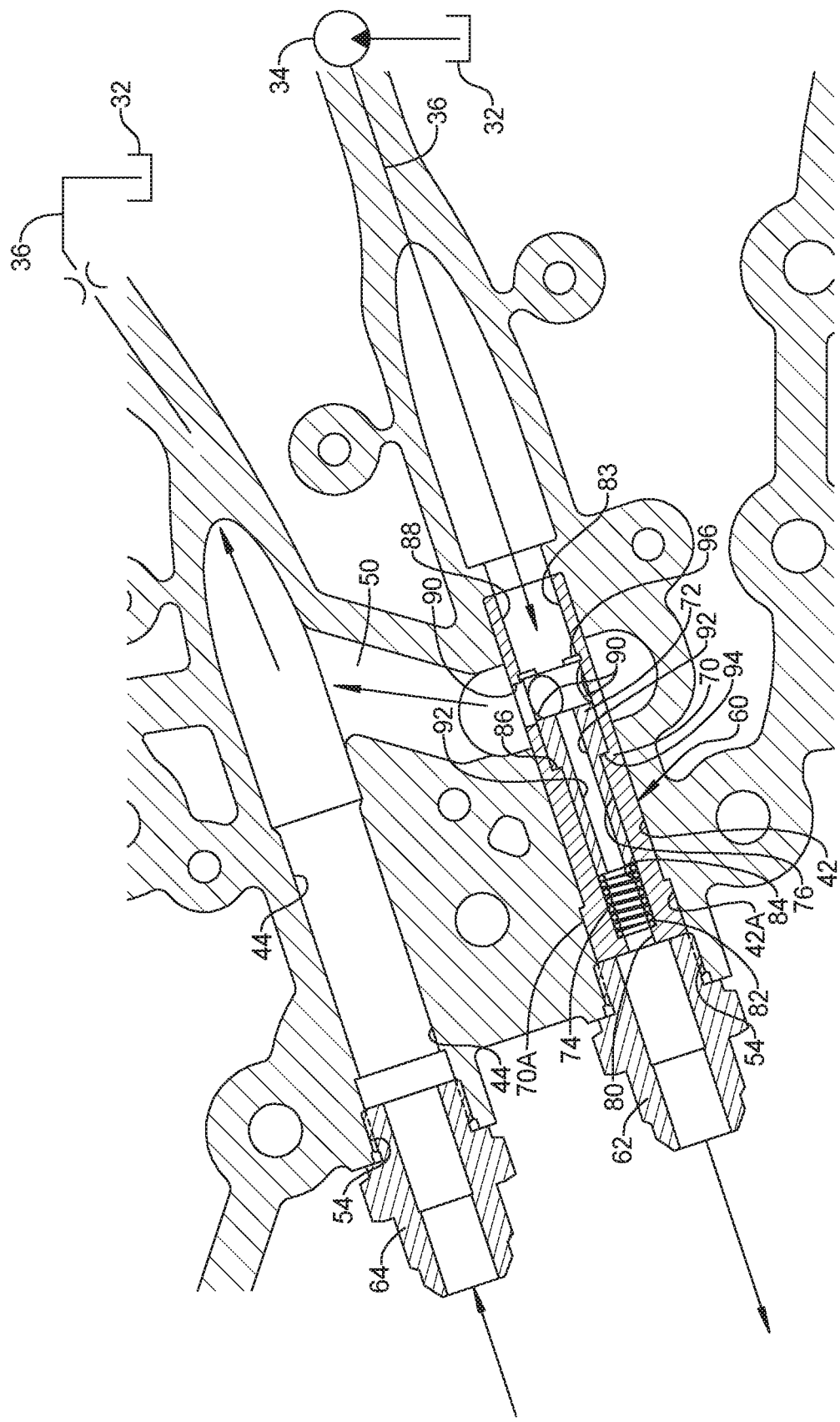

FIG. 5 is a schematic view of the transmission lubrication passage in a configuration having a bypass cartridge connected to an oil cooler connected to an exterior heat exchanger with a partially opened bypass passage; and FIG. 6 is a schematic view of the transmission lubrication passage in a configuration having a bypass cartridge connected to an oil cooler connected to an exterior heat exchanger with a fully opened bypass passage.

Corresponding reference numerals indicate corresponding parts throughout the several views of the drawings.

DETAILED DESCRIPTION

Example embodiments will now be described more fully with reference to the accompanying drawings Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
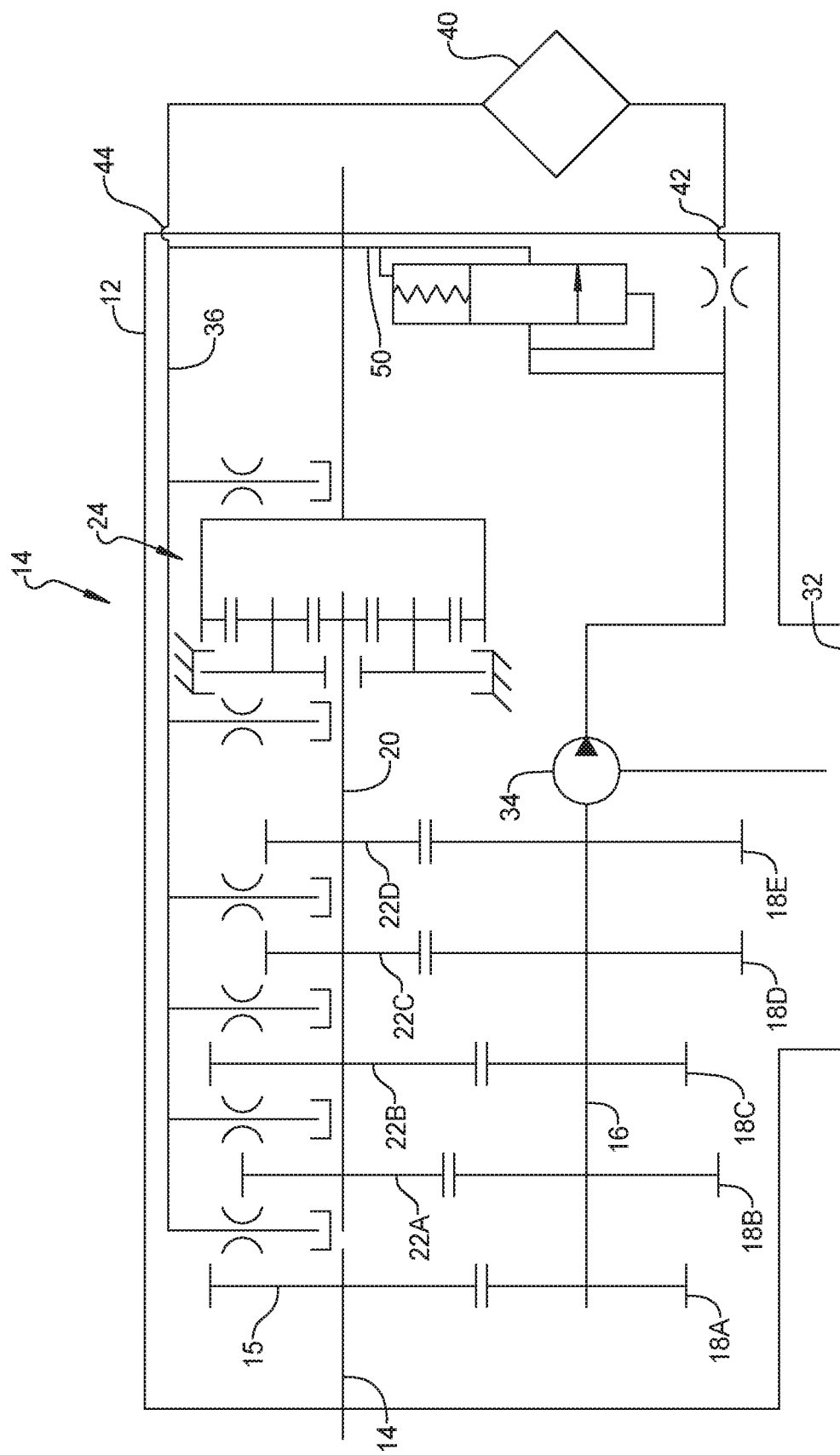
FIG. 1 is a schematic illustration of a transmission having an exterior cooler and a heat exchanger bypass cartridge according to the principles of the present disclosure.
Figure 2:
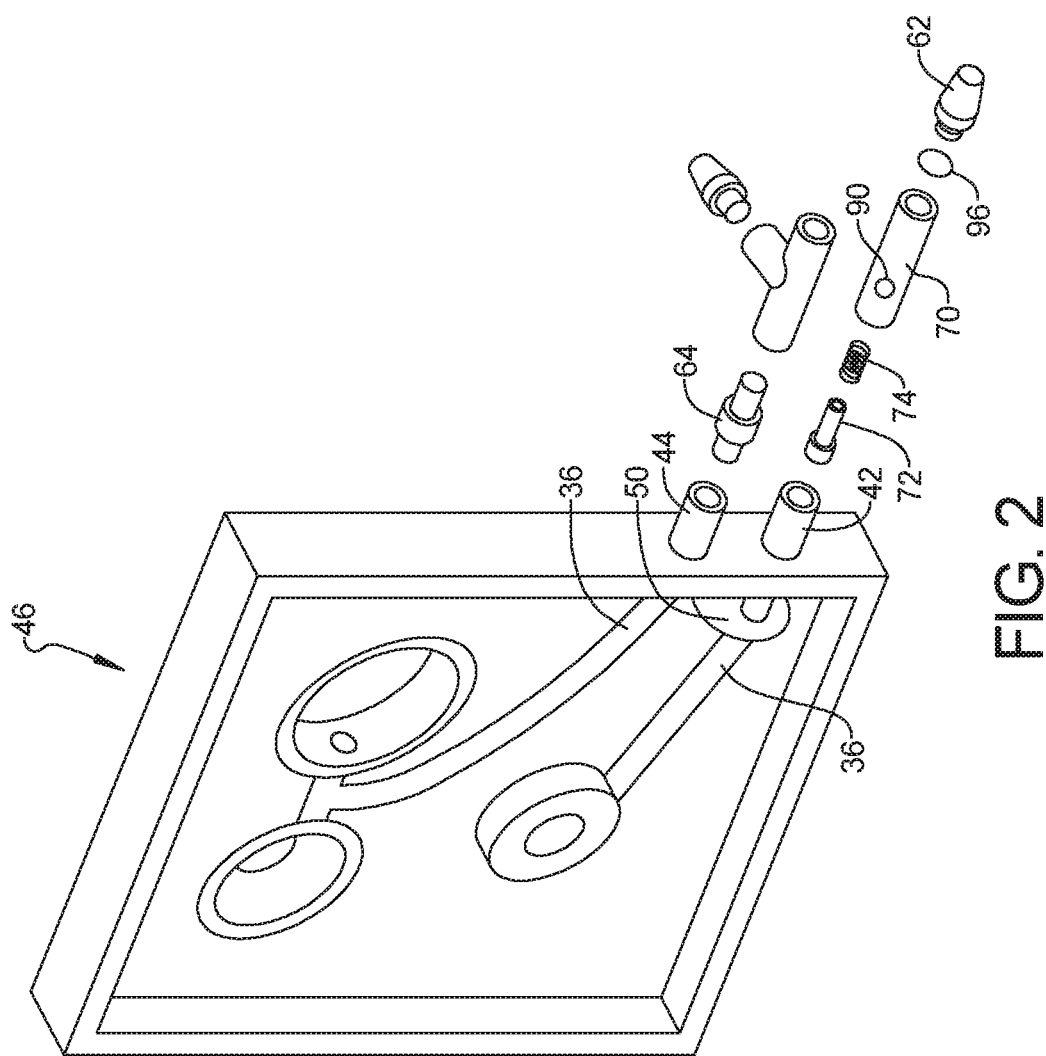
FIG. 2 is a schematic exploded perspective view of a transmission case having a heat exchanger bypass cartridge according to the principles of the present disclosure.

With reference to FIG. 1, an example transmission 10 includes a housing 12 and an input shaft 14 configured to couple to a prime mover, a countershaft 16 having a first number of gears 18A-18E mounted thereon, and a main shaft 20 having a second number of gears 22A-22D mounted thereon. The input shaft has an input gear 15 drivingly engaged with the gear 18A of the counter shaft 16. A shifting actuator (not shown) can selectively couple the input shaft 14 to the main shaft 20 by rotatably coupling at least one of the first number of gears 18B-18E to the countershaft 16 and/or coupling the second number of gears 22A-22D to the main shaft 20, and wherein the countershaft 16 and the main shaft 20 are at least partially positioned within the housing. An additional planetary gear assembly 24 can be utilized to provide additional gear reduction.

It should be noted that the transmission can have various forms of manual, automated manual and automatic transmissions. In the embodiment shown, an automated manual transmission in provided schematically showing a single countershaft 16. It should be understood that a dual countershaft system can be utilized. In addition, the transmission 12 housing can be made from steel or aluminum and the number of gears on the counter shaft 16 and the main shaft 20 can be varied.

The transmission 10 includes a lubrication system including an oil sump 32, an oil pump 34, and an oil passage system 36 for directing oil from the oil sump 32 to various components (bearings and gears) of the transmission. The transmission 10 is capable of being assembled as a coolerless transmission and alternatively as a transmission having an oil cooler 40. In particular, the oil passage system 36 includes an oil outlet opening 42 in communication with the oil pump 34 and extending out of the housing 12 and an oil inlet opening 44 extending into the housing 12.

As shown in FIGS. 2-5, the oil outlet opening 42 and the oil inlet opening 44 can be disposed in a housing component such as a case 46 that can include an end case or intermediate case of the transmission housing 12. Alternatively, the oil outlet opening 42 and the oil inlet opening 44 can be disposed in alternative structure of the transmission housing 12. As best shown in FIGS. 2-5, a bypass flow passage 50 extends from the oil outlet opening 42 to the oil inlet opening 44 within the case 46.

Figure 3:
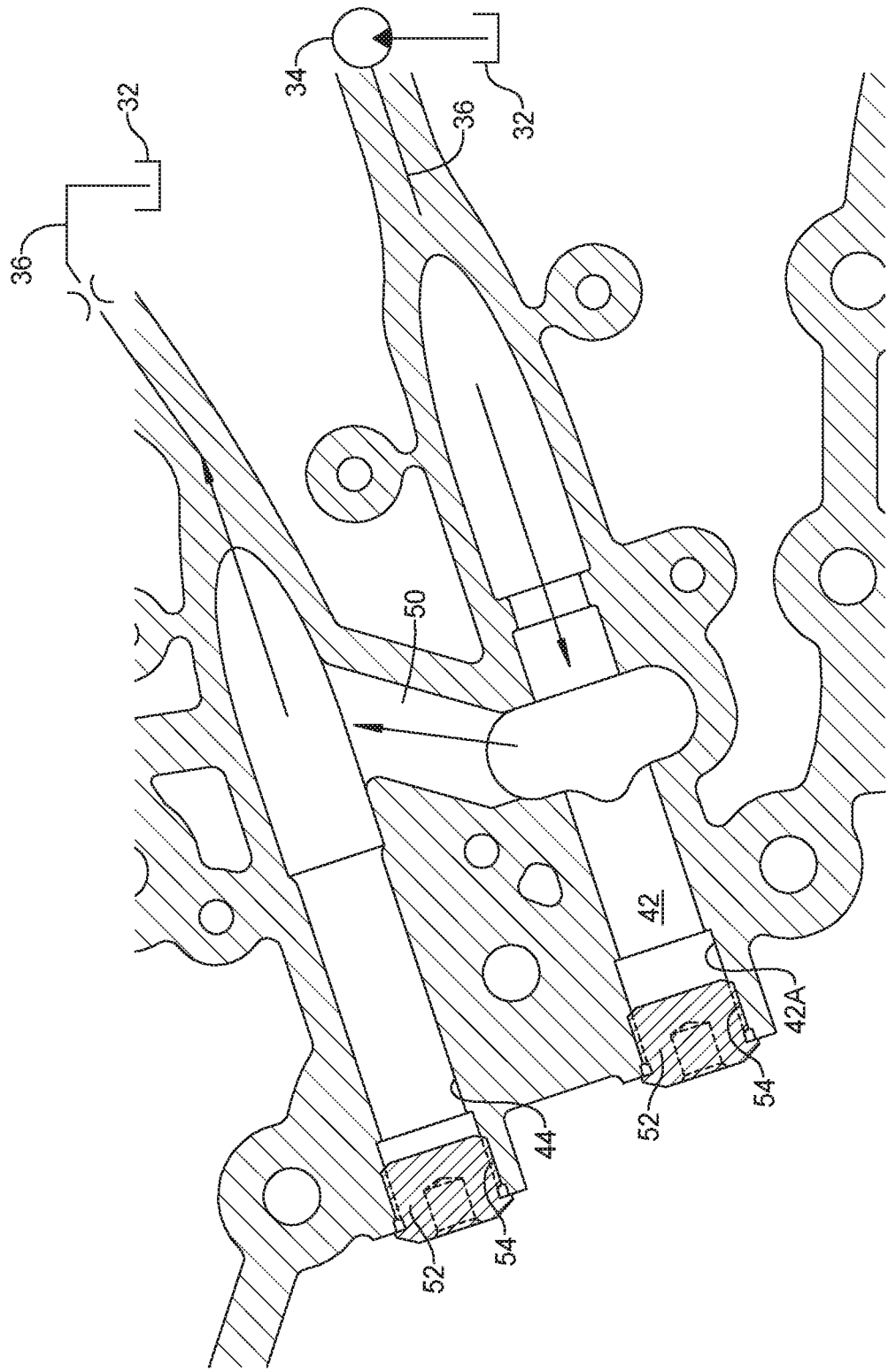
FIG. 3 is a schematic view of the transmission lubrication passage in a coolerless configuration.

In a coolerless transmission configuration, as shown in FIG. 3, the oil outlet opening 44 and the oil inlet opening 44 are each plugged by a threaded plug 52 inserted in threaded ends 54 of each of the outlet and inlet openings 42, 44. In this configuration, oil from the oil pump 34 is directed through the bypass flow passage 50 to the remainder of the oil passage system 36 to lubricate the various components (bearings and gears) of the transmission 10 without cooling the oil.

In a configuration of the transmission having an oil cooler 40, as shown in FIGS. 1 and 4-6, a cooler bypass cartridge assembly 60 is disposed in the oil outlet opening 42 and is secured therein by a cooler outlet fitting 62 threadedly connected to the threaded end 54 of the oil outlet opening 42. A cooler inlet fitting 64 is connected to the threaded end 54 of the oil inlet opening 44. The cooler outlet fitting 62 is connected to the oil cooler 40 by a conduit 68 in a form of a hose, tube, pipe, or other passage and the cooler inlet fitting 64 is connected to the oil cooler 40 by a conduit 68 in a form of a hose, tube, pipe, or other passage.

Figure 4:
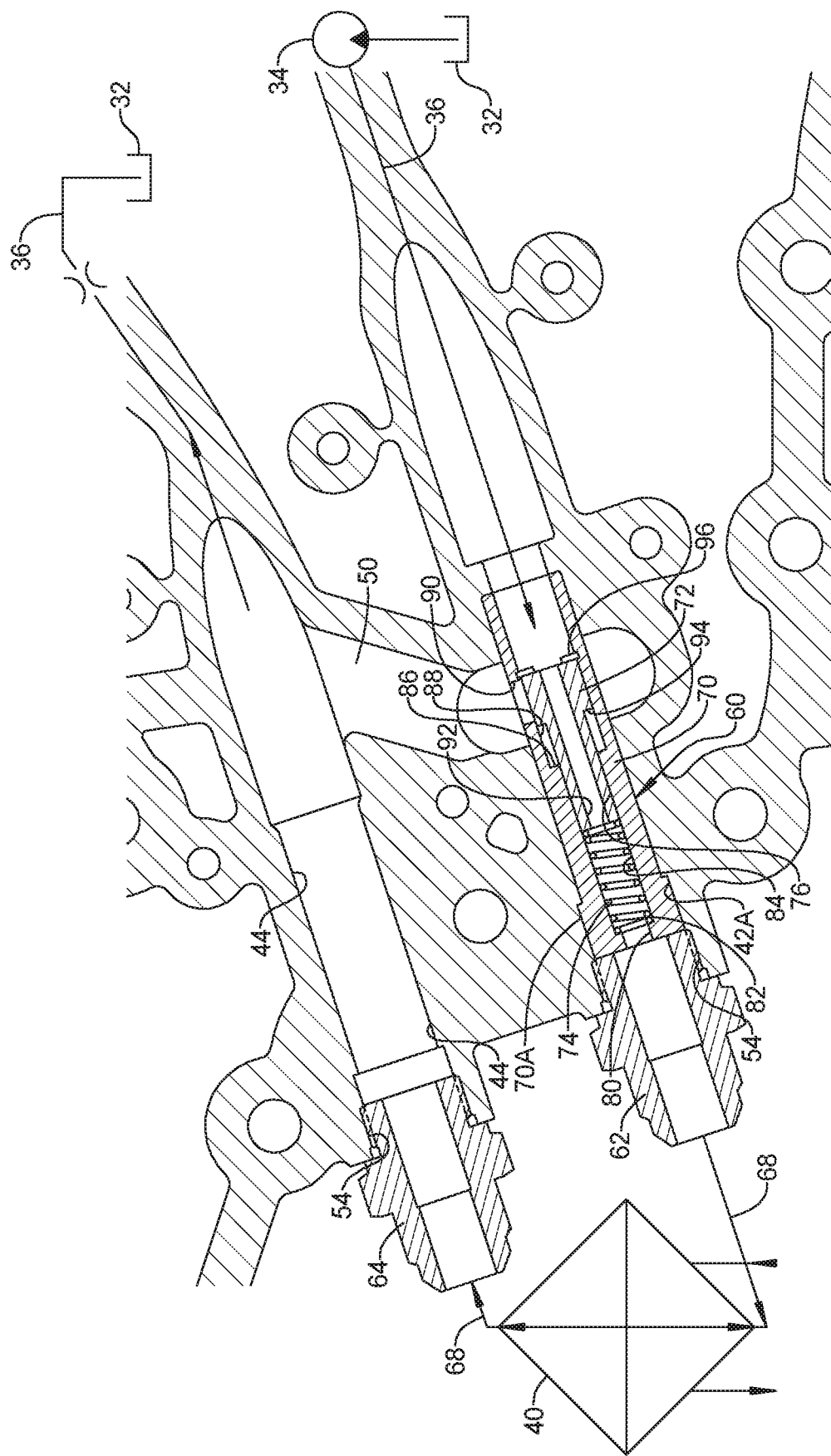
FIG. 4 is a schematic view of the transmission lubrication passage in a configuration having a bypass cartridge connected to an oil cooler connected to an exterior heat exchanger and closing off a bypass passage.

With reference to FIGS. 4-6, the cooler bypass cartridge assembly 60 includes a cartridge main body 70, a cooler bypass spool 72, and a spring 74. The cartridge main body 70 can include a hollow axial passage 76 extending there through and an outer surface with a distal end with a larger diameter portion 70A received in a corresponding larger diameter outer portion 42A of the outlet opening 42 to prevent the cartridge assembly 60 from being installed the wrong way. The hollow axial passage 76 includes a multi-stepped interior surface 78 having a smallest diameter portion 80 at a distal end, a first increased diameter shoulder portion 82 transitioning to an intermediate diameter portion 84, a second increased diameter shoulder portion 86 transitioning to a largest diameter portion 88. The cartridge main body 70 includes a plurality of radial passages 90 extending through the largest diameter portion 88 and aligned with the bypass flow passage 50 in an installed condition. The cooler bypass spool 72 is disposed within the cartridge main body 70 and is biased by the spring 74 to an extended position covering the radial passages 90 and thereby closing off the bypass flow passage 50. The cooler bypass spool 72 has a hollow passage 92 extending axially there through.

The lubricating oil flowing through the oil passage system 36 is directed through the hollow passage 92 in the cooler bypass spool 72 and to the oil cooler 40. The oil is then returned to the transmission 10 through the cooler inlet fitting 64 and oil inlet opening 44. The spring 74 is seated against the shoulder portion 82 and an end of the spool 72. The spool 72 includes a shoulder portion 94 that engages the shoulder 86. A stop ring 96 or other stopping structure is disposed in the interior surface 78 of the cartridge main body 70 and serves as a stop for the cooler bypass spool 72, as shown in FIG. 4. As the pressure against the end of the spool 72 is increased, the spool 72 moves against the biasing force of the spring 74 to partially uncover the radial passages 90, as shown in FIG. 5. Accordingly, as the pressure in the oil passage system 36 increases, the spool valve 72 moves to open the radial passages 90 further to allow the pressurized oil to bypass the oil cooler 40, as shown in FIG. 6, so that oil can flow both through the cooler 40 and the bypass passage 50.

The heat exchanger bypass valve cartridge assembly 60 can be installed and serviced externally in order to add a heat exchanger capability to the transmission device that provides the ability to flow the oil to a heat exchanger. The design minimizes the cost of the base transmission 10 by not adding additional structure to the transmission 10. Accordingly, the transmission 10 of the present disclosure can be utilized in a coolerless configuration (FIG. 3) or a configuration that includes an oil cooler 40 (FIGS. 4-6). The present disclosure minimizes the cost for the base transmission unit which is not expected to require a heat exchanger/oil cooler. The bypass valve cartridge assembly 60 minimizes the pressure drop of the lubrication circuit, and increases fuel economy when the transmission 10 does not require an oil cooler 40. This means a non-oil cooler unit could be upgraded to use an oil cooler 40, if the application changes from how it was originally intended. The design will help prevent over cooling of the oil when used with an air to oil cooler. As the oil becomes cooler, the bypass valve cartridge assembly 60 will respond to the increased pressure of the more viscous cooler oil and will serve as a pressure limiting device to automatically send less oil to the oil cooler 40. The hole 92 through the spool 72 acts as a flow control device. As the flow through the spool hollow passage 92 increases, the pressure drop across the spool 72 increases. This increased pressure drop increases the net force acting to open the spool 72 and the spool 72 starts to move in the open direction to uncover the radial passages 90 to allow oil to bypass the oil cooler via the bypass flow passage 50. The design will help limit the maximum lube pressure observed at the pump 34 when the oil cooler 40 is in place. In addition, the design of the present disclosure can be utilized across many different transmission configurations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transmission, comprising:
    a housing;
    an input shaft and an output shaft disposed in the housing and being drivingly connected to one another by a plurality of gears disposed in the housing;
    a lubrication system including an oil sump, an oil pump and an oil passage system for directing oil from the oil sump to various components of the transmission;
    the oil passage system including an oil passage having an oil outlet opening extending out of the housing and an oil inlet opening extending into the housing, wherein a bypass flow passage is disposed in the housing in communication with the oil outlet opening and the oil inlet opening;
    a heat exchanger having an inlet passage connected to the oil outlet opening, the heat exchanger having an outlet passage connected to the oil inlet opening;
    a cooler bypass assembly disposed in the oil outlet opening, the bypass assembly including an oil cooler bypass spool biased by a spring to a first position for at least restricting flow through the bypass flow passage, wherein the oil cooler bypass spool is movable against the force of the spring to a second position for fully opening the bypass flow passage; and
    wherein the cooler bypass assembly further includes a cartridge main body having a passage extending axially there through, wherein the oil cooler bypass spool and the spring are disposed in the passage in the cartridge main body.

2. The transmission according to claim 1, wherein the cartridge main body further includes at least one radially extending opening that aligns with the bypass flow passage.

3. The transmission according to claim 2, wherein the cooler bypass spool includes a first portion that is aligned with the at least one radially extending opening when the cooler bypass spool is in the first position.

4. The transmission according to claim 3, wherein the passage of the cartridge main body includes a first reduced diameter interior shoulder portion defining a spring seat for the spring and a second interior shoulder portion forming a stop portion for an increased diameter portion of the cooler bypass spool.

5. The transmission according to claim 1, wherein the cartridge main body is supported within the oil outlet opening by a fitting received in the oil outlet opening and extending to an exterior of the housing.

6. A transmission capable of being assembled as a coolerless transmission and a transmission having an oil cooler, comprising:
    a housing;
    an input shaft and an output shaft disposed in the housing and being drivingly connected to one another by a plurality of gears disposed in the housing;
    a lubrication system including an oil sump, an oil pump and an oil passage system for directing oil from the oil sump to various components of the transmission;
    the oil passage system including an oil passage having an oil outlet opening extending out of the housing and an oil inlet opening extending into the housing, wherein a bypass flow passage is disposed in the housing in communication with the oil outlet opening and the oil inlet opening;
    wherein in a coolerless configuration a pair of plugs are inserted in the oil outlet opening and the oil inlet opening to close off the oil outlet opening and the oil inlet opening so that oil flows from the oil outlet opening to the oil inlet opening through the bypass flow passage; and
    wherein in a transmission configuration having the oil cooler a heat exchanger is connected to the oil outlet opening and the oil inlet opening, wherein in the transmission configuration having the oil cooler, a cooler bypass assembly is disposed in the oil outlet opening, the bypass assembly including an oil cooler bypass spool biased by a spring to a first position for at least restricting flow through the bypass flow passage, wherein the oil cooler bypass spool is movable against the force of the spring to a second position for opening the bypass flow passage, wherein the cooler bypass assembly further includes a cartridge main body having a passage extending axially there through, wherein the oil cooler bypass spool and the spring are disposed in the passage in the cartridge main body.

7. The transmission according to claim 6, wherein the cartridge main body further includes at least one radially extending opening that aligns with the bypass flow passage.

8. The transmission according to claim 7, wherein the cooler bypass spool includes a first portion that is aligned with the at least one radially extending opening when the cooler bypass spool is in the first position.

9. The transmission according to claim 8, wherein the passage of the cartridge main body includes a first reduced diameter interior shoulder portion defining a spring seat for the spring and a second interior shoulder portion forming a stop portion for an increased diameter portion of the cooler bypass spool.

10. The transmission according to claim 6, wherein the cartridge main body is supported within the oil outlet opening by a fitting received in the oil outlet opening and extending to an exterior of the housing.

\* \* \* \* \*